United States Patent
Yang et al.

(10) Patent No.: US 7,020,333 B2
(45) Date of Patent: Mar. 28, 2006

(54) APPARATUS AND METHOD FOR EQUALIZING HISTOGRAM OF AN IMAGE

(75) Inventors: Seung-joon Yang, Gyeonggi-do (KR); Kyng-sun Min, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 589 days.

(21) Appl. No.: 10/087,831

(22) Filed: Mar. 5, 2002

(65) Prior Publication Data

US 2003/0035579 A1  Feb. 20, 2003

(30) Foreign Application Priority Data

Aug. 18, 2001  (KR) ............... 2001-49810

(51) Int. Cl.
*G06K 9/00* (2006.01)
(52) U.S. Cl. .............. 382/169; 382/167; 358/3.01; 358/3.02; 345/690; 345/691
(58) Field of Classification Search ........ 382/162, 382/167, 237, 168, 169, 254, 274, 128, 171–172, 382/190; 358/3.01, 3.02, 3.03, 3.23, 23; 348/630, 631, 672; 345/596, 690, 691–692; 714/704
See application file for complete search history.

(56) References Cited

U.S. PATENT DOCUMENTS

| | | | | | |
|---|---|---|---|---|---|
| 5,835,163 | A | * | 11/1998 | Liou et al. ............. | 348/700 |
| 5,949,916 | A | * | 9/1999 | Chun .................. | 382/261 |
| 6,061,091 | A | * | 5/2000 | Van de Poel et al. .... | 348/241 |
| 6,078,686 | A | * | 6/2000 | Kim ................... | 382/167 |
| 6,125,194 | A | * | 9/2000 | Yeh et al. ............. | 382/132 |
| 6,154,560 | A | * | 11/2000 | Cothren et al. ......... | 382/128 |

* cited by examiner

*Primary Examiner*—Kanjibhai Patel
*Assistant Examiner*—Ali Bayat
(74) *Attorney, Agent, or Firm*—Staas & Halsey LLP

(57) ABSTRACT

An apparatus and method are provided to equalize a histogram using a cumulative distribution function (CDF) of an image. A model parameter estimator estimates parameters from the image using a Gaussian model. An error function storing unit stores error function values based on a Gaussian distribution. A CDF calculator calculates a CDF using one of the error function values from the error function storing unit and the estimated parameters. A histogram equalizer performs histogram equalization using the CDF.

17 Claims, 5 Drawing Sheets

APPARATUS AND METHOD FOR EQUALIZING HISTOGRAM OF AN IMAGE

CROSS-REFERENCE TO RELATED APPLICATIONS

This application claims the benefit of Korean Application No. 2001-49810, filed Aug. 18, 2001, in the Korean Intellectual Property Office, the disclosure of which is incorporated herein by reference.

BACKGROUND OF THE INVENTION

1. Field of the Invention

The present invention relates to a method of equalizing a histogram of an image, and more particularly, to a method of equalizing a histogram of an image using a Gaussian model so that the contrast can be adjusted.

2. Description of the Related Art

Inspecting a tone distribution of an image to be processed is essential to image preprocessing. A graph showing a tone distribution with respect to all pixels in the image, within an M×N pixel matrix using frequency by tones is referred to as an image histogram.

When the image histogram inclines from a bright to a dark side or vice versa or is concentrated on a particular tone value, a corresponding image cannot be said to be good.

When the histogram of an input image inclines to one side, tone conversion is used for obtaining an image with a high contrast. Essentially, the tone conversion converts a tone distribution of the input image according to predetermined conversion characteristics.

Particularly, when information about an object desired to be recognized is unknown, histogram equalization is used as a method for automatically enhancing an image of the object. This method changes the tone distribution on the image so that the image histogram is even. In this method, probabilities of all tone values are equalized to be the same.

Figure 1A:
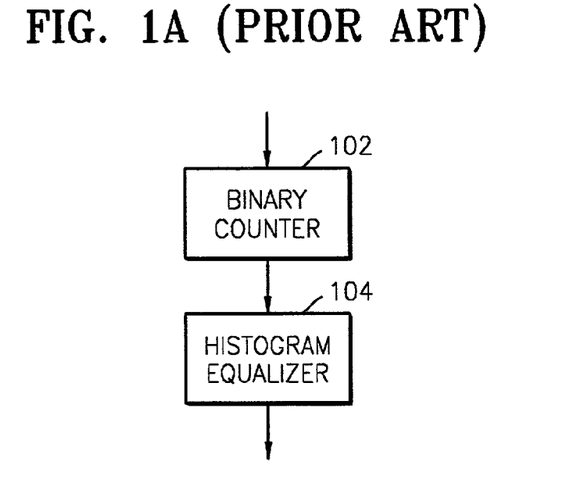
FIG. 1A shows a conventional one-way histogram equalization apparatus.
Figure 1B:
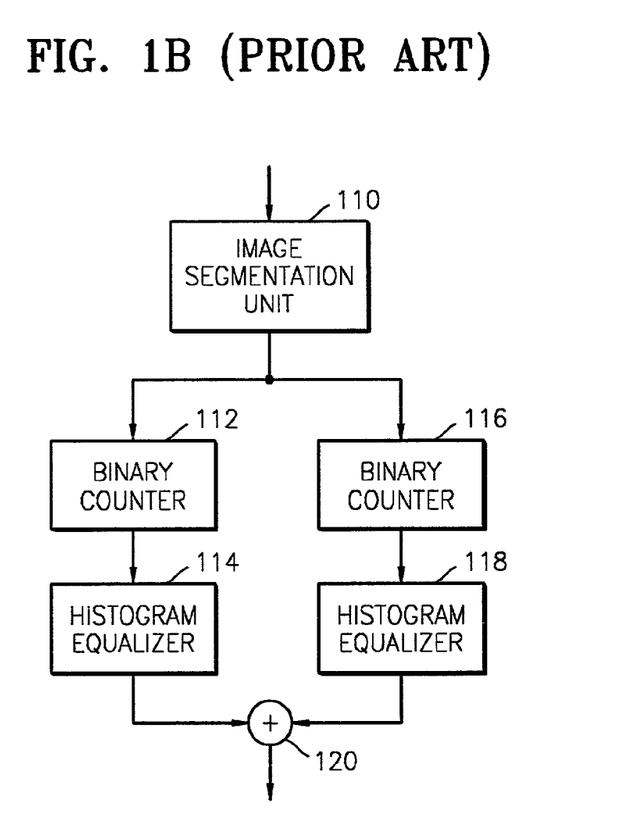
FIG. 1B shows a conventional two-way histogram equalization apparatus.

FIG. 1A shows a conventional one-way histogram equalization apparatus, which does not consider relative brightness. FIG. 1B shows a conventional two-way histogram equalization apparatus which considers relative brightness.

The one-way histogram equalization apparatus shown in FIG. 1A includes a binary counter 102 for obtaining a cumulative distribution function (CDF) with respect to the input image through binary counting. The one-way equalization apparatus also includes a histogram equalizer 104 for increasing the contrast of a given image using the CDF.

The binary counter 102 counts a number of pixels with each particular value in a given image, obtains a probability density function (PDF), and performs cumulative summation on the PDF to obtain a CDF.

The histogram equalizer 104 applies the CDF to the given image by way of nonlinear mapping, thereby obtaining an image having an equalized histogram, that is, an image with an increased contrast.

However, it is difficult to control a degree of contrast enhancement in a conventional histogram equalization apparatus as shown in FIG. 1A because the PDF and the CDF are determined based on the given image, and because the PDF and the CDF are used as they are for mapping performed for contrast enhancement. In addition, when the attribute of the given image is peculiar or is degraded due to noise, an undesirable image result is frequently obtained.

In the one-way histogram equalization apparatus as shown in FIG. 1A, relative brightness is not maintained. The brightness of the image obtained through histogram equalization has no relation with the brightness of the given image, so a bright scene is not discriminated from a dark scene in a video sequence, that is, in consecutive images.

To overcome the above problems, the two-way histogram equalization apparatus shown in FIG. 1B has been proposed. The two-way histogram equalization apparatus includes an image segmentation unit 110 to segment a given image into a subimage having a bright region and a subimage having a dark region. Binary counters 112 and 116 and histogram equalizers 114 and 118 are structurally and functionally the same as the one-way histogram equalization apparatus shown in FIG. 1A. The two-way histogram equalization apparatus includes a mixer 120 to combine the results from the output from the histogram equalizers 114, 118.

The two-way histogram equalization apparatus segments the image into a bright region and a dark region and separately performs histogram equalization on the segmented regions, so relative brightness is maintained. However, as in the one-way histogram equalization apparatus, when the attribute of a given image is peculiar or is degraded due to noise, an undesirable image result is obtained.

SUMMARY OF THE INVENTION

Various objects and advantages of the invention will be set forth in part in the description that follows and, in part, will be obvious from the description, or may be learned by practice of the invention.

To solve the above-described problems, the present invention provides a histogram equalization apparatus, which allows a relative brightness of an image to be maintained and easily controls a degree of contrast enhancement by calculating a cumulative distribution function (CDF) using parameters estimated from a Gaussian distribution of the image and an error function with respect to a standard Gaussian distribution.

It is a second object of the present invention to provide a histogram equalization method which allows a relative brightness of an image to be maintained and easily controls a degree of contrast enhancement by calculating a cumulative distribution function (CDF) using parameters estimated from a Gaussian distribution of the image and an error function with respect to a standard Gaussian distribution.

To achieve the first and other objects of the invention, there is provided an apparatus equalizing a histogram using a CDF of an image. The apparatus includes a model parameter estimator estimating parameters, mean and variance, from the image using a Gaussian model; an error function storing unit storing error function values based on a Gaussian distribution with a zero mean and a unit variance; a CDF calculator calculating a CDF using the parameters from the model parameter estimator and the error function values from the error function storing unit; and a histogram equalizer performing histogram equalization using the CDF calculated by the CDF calculator.

Further, an apparatus is provided equalizing a histogram using a cumulative distribution function (CDF) of an image, the apparatus including: a model parameter estimator estimating parameters from the image using a Gaussian model; an error function storing unit storing error function values based on a Gaussian distribution a CDF calculator calculating a CDF using one of the error function values from the error function storing unit and the estimated parameters; and a histogram equalizer performing histogram equalization using the CDF.

The apparatus further includes a model parameter modifier modifying the parameters, mean and variance, estimated by the model parameter estimator and outputting modified parameters to the CDF calculator.

To achieve the second and other objects of the invention, there is provided a method to equalize a histogram using a CDF of an image. The method includes: estimating parameters from the image using a Gaussian model; calculating a CDF using the parameters and an error function value; and performing histogram equalization using the CDF.

A method is provided to equalize a histogram using a cumulative distribution function (CDF) of an image, the method includes: estimating parameters including mean and variance, from the image using a Gaussian model; storing error function values based on a Gaussian distribution with a zero mean and a unit variance; calculating a CDF using the parameters and the error function values; and performing histogram equalization using the CDF calculated.

The method further includes segmenting the image into subimages, each subimage including Gaussian distributions. Here, the CDF is calculated with respect to each of the subimages, and the histogram equalization is performed by applying the CDFs to the subimages.

These together with other objects and advantages, which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Hereinafter, embodiments of the present invention will be described in detail with reference to the attached drawings.

Figure 2:
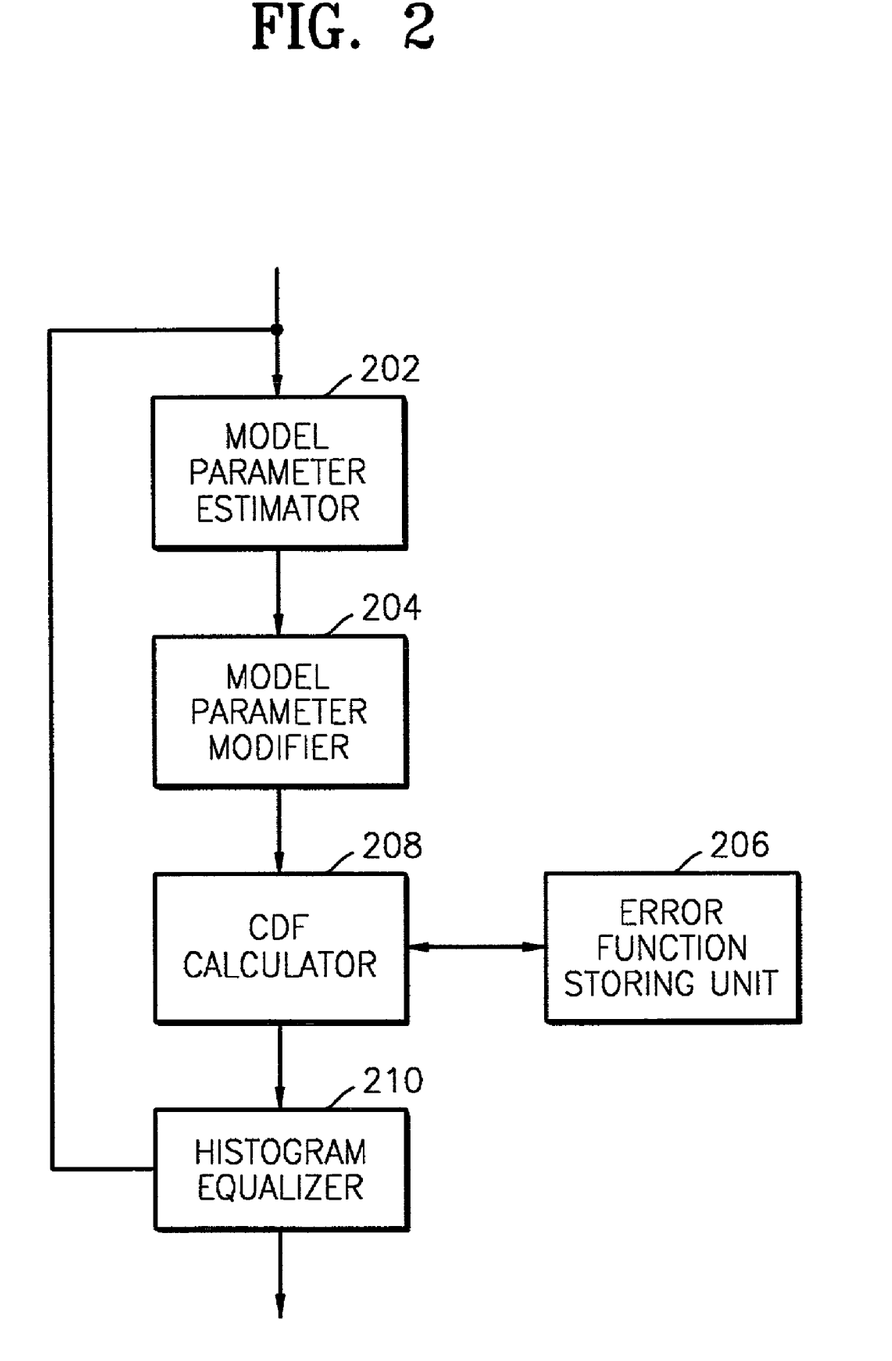
FIG. 2 is a block diagram of a first embodiment of a histogram equalization apparatus according to the present invention.

FIG. 2 is a block diagram of a first embodiment of a histogram equalization apparatus according to the present invention. The histogram equalization apparatus shown in FIG. 2 includes a model parameter estimator 202, a model parameter modifier 204, an error function storing unit 206, a cumulative distribution function (CDF) calculator 208, and a histogram equalizer 210.

The model parameter estimator 202 estimates two parameters, a mean and a variance, from a given image using a Gaussian model. The model parameter modifier 204 modifies the parameters (i.e., the means and the variance) estimated by the model parameter estimator 202. This modification causes a shape of a cumulative distribution function (CDF), which is generated by the CDF calculator 208, to change, thereby enhancing a contrast of the image.

The CDF calculator 208 calculates the CDF using an error function value based on a Gaussian distribution with a zero mean and a unit variance from the error function storing unit 206, and the modified parameters, i.e., the modified mean and variance from the model parameter modifier 204. In one embodiment, the error function storing unit 206 may be implemented in the form of a look-up table. The histogram equalizer 210 performs histogram equalization using the CDF calculated by the CDF calculator 208.

The operations of the histogram equalization apparatus shown in FIG. 2 will now be described in more detail. Estimation of tones is essential to histogram equalization. One of simple methods of estimating tones is to use the Gaussian model. In the Gaussian model, it is satisfactory to estimate only two model parameters, i.e., a mean, $\mu$, and a variance, $\sigma^2$.

The estimated probability density function (PDF) of a given image is given by $$\hat{P}_F(x) = \frac{1}{\sqrt{2\pi\sigma^2}} e^{-(x-\mu)^2/2\sigma^2} \qquad (1)$$

Further, the CDF with respect to the Gaussian model is obtained by using Formula (2)

$$\hat{C}_F(x) = \frac{1}{\sqrt{2\pi\sigma^2}} \int_0^x e^{-(t-\mu)^2/2\sigma^2} dt = \text{erf}(x; \mu, \sigma^2) \qquad (2)$$

Here, erf($x;\mu,\sigma^2$) is an error function from the Gaussian distribution having ($x;\mu,\sigma^2$).

In the Gaussian model, the CDF can be calculated referring to a table storing error function having a zero mean and a unit variance. Accordingly, a look-up table may substitute for binary counting and cumulative summation performed in a conventional histogram equalization apparatus. Mapping, h, used for enhancing image contrast is a function of the two parameters.

The following relationship is well known: erf($x;\mu,\sigma^2$)=erf($\sigma x-\mu;0,1$). In this case, erf($\sigma x-\mu;0,1$) is determined by the error function having a zero mean and a unit variance and $\sigma z+\mu$. The error function having a zero mean and a unit variance is stored in the look-up table, i.e., the error function storing unit 206, and an error function value can be obtained from the look-up table using $\sigma z+\mu$ as an address.

The CDF calculator 208 calculates an error function value using the following algorithm:
 for x=0,255
  tt=$\sigma$x+$\mu$
  y=erf(tt;0,1)
 CDF(x)=y;
  end.

Here, x is a gradation value, and, for illustrative purposes, x ranges from 0 to 255.

Figure 3A:
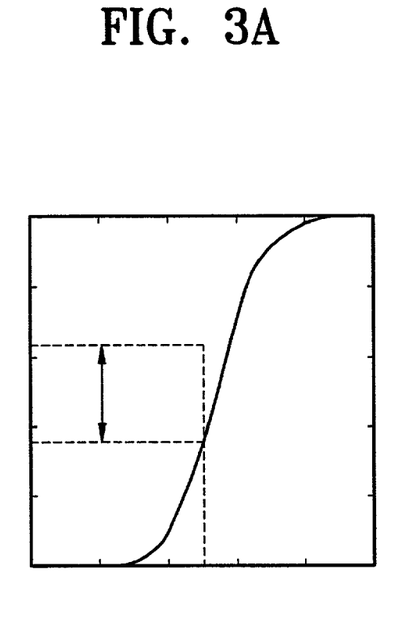
FIG. 3A shows a change in brightness by varying a mean from a given image.
Figure 3B:
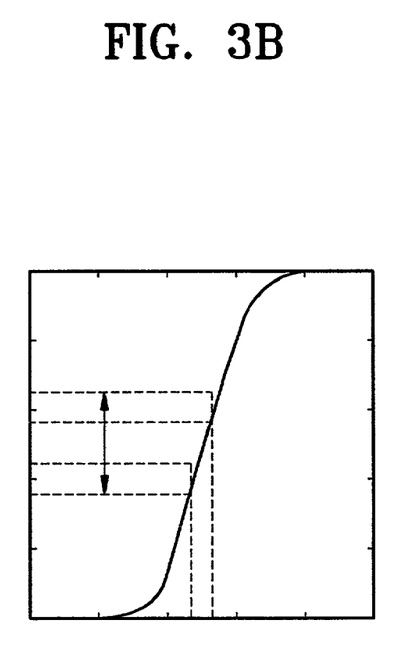
FIG. 3B shows a change in contrast by varying a variance from the given image.

FIGS. 3A and 3B show effects of varying the parameters from the given image. FIG. 3A shows a change in brightness by varying the mean from the given image. FIG. 3B shows a change in contrast by varying the variance from the given image. Particularly, varying the variance causes a slope of the error function to change. The enhanced contrast of an image changes depending on a change in the slope of the error function.

Figure 4:
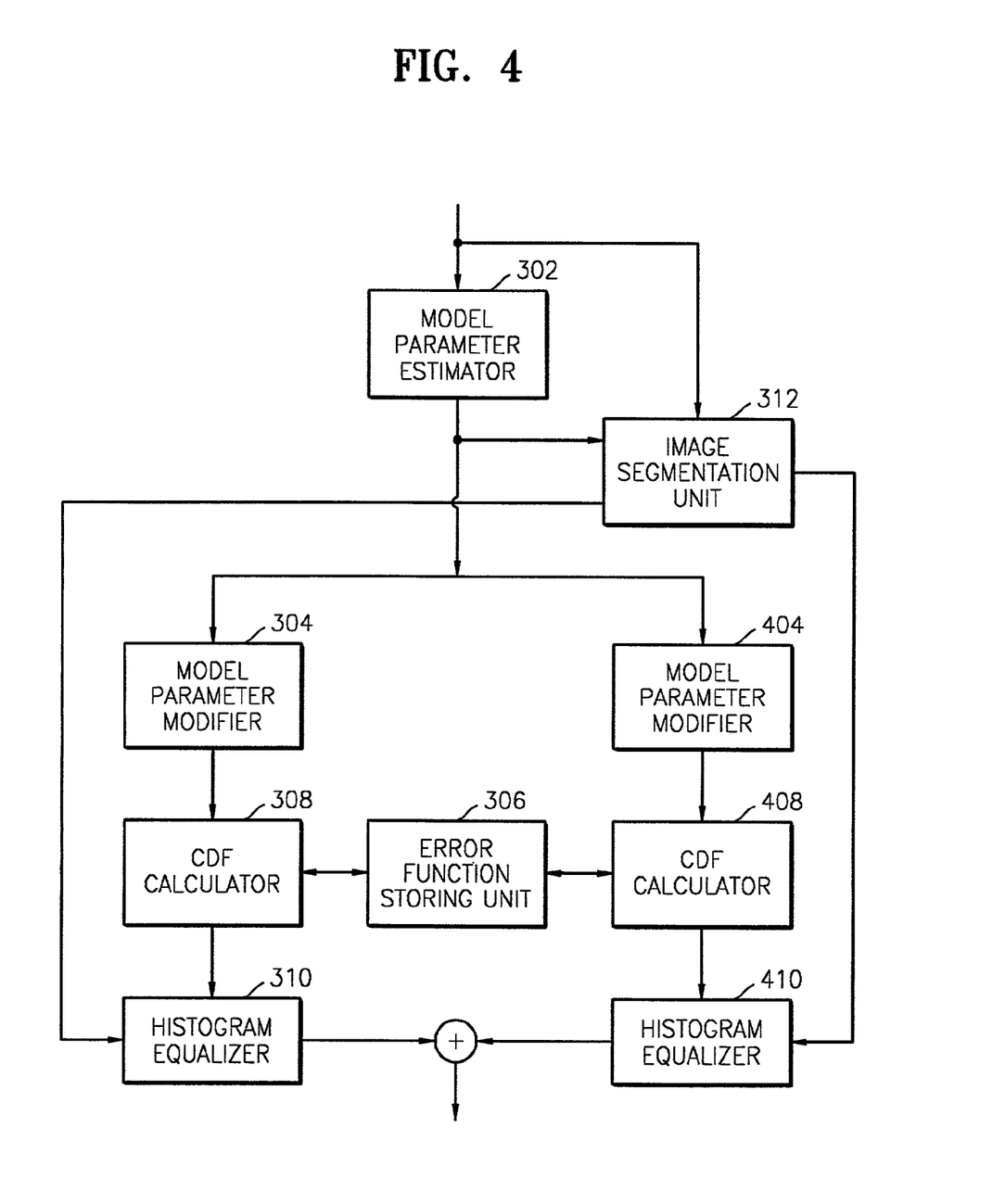
FIG. 4 is a block diagram of a second embodiment of a histogram equalization apparatus according to the present invention.

FIG. 4 is a block diagram of a second embodiment of the histogram equalization apparatus according to the present invention. In the second embodiment, the histogram equalization apparatus is configured considering relative brightness.

The histogram equalization apparatus shown in FIG. 4 includes a model parameter estimator 302, model parameter modifiers 304 and 404, an error function storing unit 306, CDF calculators 308 and 408, histogram equalizers 310 and 410, and an image segmentation unit 312.

An operation of the histogram equalization apparatus shown in FIG. 4 includes operating one system including the model parameter modifier 304, the error function storing unit 306, the CDF calculator 308, and the histogram equalizer 310 and operating another system including the model parameter modifier 404, the error function storing unit 306, the CDF calculator 408, and the histogram equalizer 410. Each system processes a corresponding segmented subimage received from the image segmentation unit 312. The one system processes a bright image region and the other system processes a dark image region. The operation of each system is the same as described in FIG. 2, with the exception that each system processes different image regions.

Figure 5A:
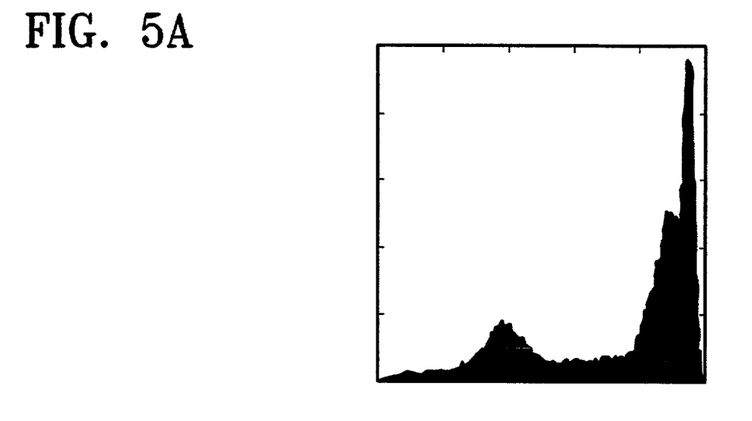
FIG. 5A schematically shows a PDF of an original image during a two-way histogram equalization.
Figure 5B:
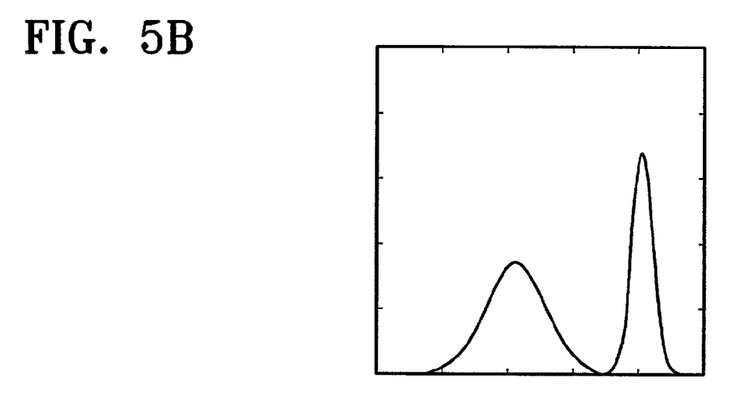
FIG. 5B schematically shows the PDF of a Gaussian model during the two-way histogram equalization.
Figure 5C:
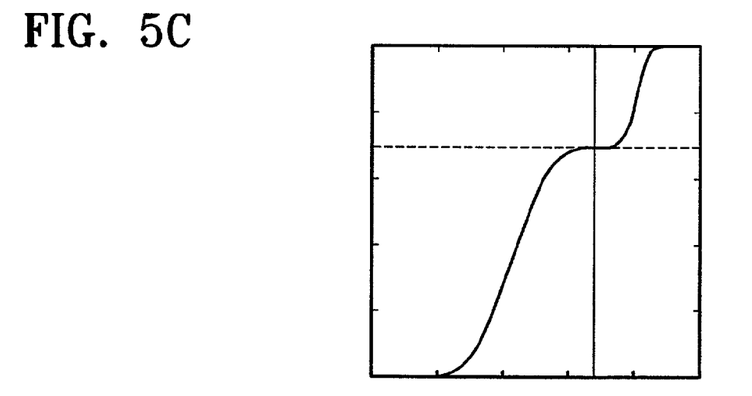
FIG. 5C schematically shows two CDFs after the two-way histogram equalization.

The operations of the histogram equalization apparatus shown in FIG. 4 will now be described in detail. FIGS. 5A through 5C schematically show estimation of tones during a two-way histogram equalization process. FIG. 5A shows a PDF of an original image. FIG. 5B shows the PDF of the Gaussian model. FIG. 5C shows two CDFs after the two-way histogram equalization process is performed.

Estimated model parameters are applied to two Gaussian distributions separately. It is assumed that two vectors are $F=(F_0,F_1,\ldots F_{MN-1})^t$ and $C=(C_0,C_1,\ldots,C_{MN-1})^t$. the real parts of F and C are expressed by $f=(f_0, f_1, \ldots, f_{MN-1})^t$ and $c=(c_0, c_1, \ldots, c_{MN-1})^t$, respectively, and can be expressed by an M×N-matrix having $f(m,n)$ and $c(m,n)$ as elements.

Cluster information $c(m,n)$ indicates a distribution to which a pixel $f(m,n)$ belongs. Each pixel $f(m,n)$ has a value of $x \in [0,L]$. The PDF of a given image may be expressed by Formula (3).

$$P_F = \sum_{i=1}^{2} P[f = x | c = i]P[c = i] \quad (3)$$

Here, $P[f=x|c=i]$ denotes a Gaussian distribution, and $P[c=i]$ denotes a class probability.

A given image f is considered as incomplete data losing cluster information c. Estimation of tones with respect to complete data (f, c) is expressed by Formula (4).

$$\hat{\theta}=\text{argmax } P[f,c|\theta] \quad (4)$$

Here, $\theta=(\mu_1,\sigma_1^2,\mu_2,\sigma_2^2,pc_1)^t$.

According to A. P. Dempster, N. M Laird, and D. B. Rubin, "Maximum Likelihood from Incomplete Data via the EM algorithm," J. Royal Statistical Soc. Ser. B, Vol. 39, n9.1, pp. 138,1977] and R. J. A. Little and D. R. Rubin, Statistical Analysis with Missing Data, John Wiley & Sons, New York, 1987], an expectation maximization (EM) algorithm provides a maximum likelihood for Formula (4).

The EM algorithm is accomplished by repeating the following two steps:

$$E\text{-step}; Q(\theta|\hat{\theta}^\tau)=E[\log P[f,c|\theta]|f,\hat{\theta}^\tau] \quad (5)$$

$$M-\text{step}; \hat{\theta}^{\tau+1}=\arg\max_{\theta} Q(\theta|\hat{\theta}^\tau) \quad (6)$$

Cluster information is determined in the M-step, and parameters for each cluster are individually obtained. The cluster information, c, can be obtained through hypothesis testing for individual elements.

$$c = \begin{cases} 1. & \text{if } P[f|c=1,\hat{\theta}^\tau]p^\tau c1 \geq p[f|c=2,\hat{\theta}^\tau](1-p^\tau c1) \\ 2. & \text{otherwise} \end{cases} \quad (7)$$

After each of all pixels is classed as one of two clusters according to the hypothesis testing, the mean and the variance are individually calculated with respect to each cluster.

After all parameters are estimated according to the EM algorithm, the CDFs of two Gaussian distributions are determined using the following two formulas:

$$\hat{C}_{F1}(x)=\text{erf}(x;\mu_1,\sigma_1^2) \quad (8)$$

$$\hat{C}_{F2}(x)=\text{erf}(x;\mu_2,\sigma_2^2) \quad (9)$$

The CDFs are used as mappings $h^1$ and $h^2$ in a two-way histogram equalization.

The given image is segmented into two subimages $f^1$ and $f^2$ by Formula (10).

$$f^i(m,n) = \begin{cases} f(m,n), & \text{if } c(m,n) = i \\ 0, & \text{otherwise} \end{cases} \quad (10)$$

$\hat{C}_{F1}$ and $\hat{C}_{F2}$ are applied to the two subimages $f^1$ and $f^2$ as the mappings $h^1:[0,L_C] \to [0,L_C]$ and $h^2:[L_C,L] \to [L_C,L]$, respectively.

$$h^1(f^1) = \frac{L_C}{\hat{C}_{F1}(L_C) - \hat{C}_{F1}(0)} \hat{C}_{F1}(f^1) \quad (11)$$

$$h^2(f^2) = \frac{L_C}{\hat{C}_{F2}(L_C) - \hat{C}_{F2}(0)} \hat{C}_{F2}(f^2) \quad (12)$$

Here, $L_C$ is a value satisfying Formula (13).

$$P[f=L_C|c=1]pc_1=P[f=L_C|c=2](1-pc_2) \quad (13)$$

If it is assumed that the enhanced subimages have a uniform distribution, an average brightness of the enhanced entire image is $$\frac{(0+L_C)pc1}{2} + \frac{(L_C+L)(1-pc2)}{2}.$$

Even after applying the two-way histogram equalization, the average brightness of the enhanced entire image is still a function of $L_C$, and changes in the relative brightness between scenes are maintained.

In the histogram equalization apparatus according to the present invention, a binary counter and a cumulative summation unit required by a conventional histogram equalization unit can be replaced by the error function storing unit realized as a look-up table, thereby simplifying the structure and allowing the result of histogram equalization to be easily controlled using model parameters.

In addition, because the histogram equalization apparatus according to the present invention controls the parameters used to obtain the CDF using the model parameter modifier, it is easy to control the degree of contrast enhancement.

The histogram equalization apparatus according to the present invention can perform histogram equalization without noise or pattern amplification through model parameter modification. Moreover, when the histogram equalization apparatus according to the present invention is applied to a two-way histogram equalization, relative brightness of given images is maintained, thereby the present invention can be easily applied to a video sequence.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus equalizing a histogram using a cumulative distribution function (CDF) of an image, the apparatus comprising:
   a model parameter estimator capable of estimating the tone of the image by estimating mean and variance parameters from the image using a Gaussian model;
   a Gaussian error function storing unit storing Gaussian error function values based on a Gaussian distribution;
   a CDF calculator calculating a CDF using one of the Gaussian error function values from the Gaussian error function storing unit and the estimated mean and variance parameters; and
   a histogram equalizer performing histogram equalization using the CDF calculated by using one of the Gaussian error function values from the Gaussian error function storing unit and the estimated mean and variance parameters.

2. The apparatus as recited in claim 1, further comprising a model parameter modifier modifying the estimated mean and variance parameters and outputting modified parameters to the CDF calculator.

3. The apparatus as recited in claim 1, wherein the CDF calculator calculates the CDF using a Gaussian error function value from the Gaussian distribution comprising a zero mean and a unit variance.

4. The apparatus as recited in claim 1, wherein the Gaussian error function storing unit comprises a look-up table.

5. The apparatus as recited in claim 1, wherein the Gaussian error function storing unit stores the Gaussian error function values with a zero mean and a unit variance.

6. An apparatus equalizing a histogram using a cumulative distribution function (CDF) of an image, the apparatus comprising:
   a model parameter estimator estimating parameters comprising mean and variance, from the image using a Gaussian model;
   a Gaussian error function storing unit storing Gaussian error function values based on a Gaussian distribution with a zero mean and a unit variance;
   a CDF calculator calculating a CDF using the parameters from the model parameter estimator and the Gaussian error function values from the Gaussian error function storing unit; and
   a histogram equalizer performing histogram equalization using the CDF calculated by the CDF calculator using the parameters from the model parameter estimator and the Gaussian error function values from the Gaussian error function storing unit.

7. The apparatus as recited in claim 6, wherein the Gaussian error function storing unit comprises a look-up table.

8. The apparatus as recited in claim 6, further comprising a model parameter modifier modifying the parameters, mean and variance, estimated by the model parameter estimator and outputting modified parameters to the CDF calculator.

9. The apparatus as recited in claim 8, wherein the model parameter modifier modifies the mean to adjust brightness of the image and modifies the variance to adjust contrast of the image.

10. An apparatus equalizing a histogram using a cumulative distribution function (CDF) of an image, the apparatus comprising:
    a model parameter estimator estimating parameters comprising mean and variance, from the image using a Gaussian model;
    a Gaussian error function storing unit storing Gaussian error function values based on a Gaussian distribution;
    CDF calculators calculating CDFs using the parameters from the model parameter estimator and the error function values from the Gaussian error function storing unit;
    an image segmentation unit segmenting the image into subimages having a Gaussian distribution; and
    histogram equalizers performing histogram equalization on the subimages provided from the image segmentation unit using the CDFs calculated by the CDF calculators using the parameters from the model parameter estimator and the error function values from the Gaussian error function storing unit.

11. The apparatus as recited in claim 10, further comprising model parameter modifiers modifying the parameters, estimated by the model parameter estimators and providing modified parameters to the CDF calculators.

12. The apparatus as recited in claim 11, wherein each of the model parameter modifiers modifies the mean to adjust brightness of the image and modifies the variance to adjust contrast of the image.

13. The apparatus as recited in claim 10, wherein the error function storing unit comprises a look-up table.

14. A method to equalize a histogram using a cumulative distribution function (CDF) of an image, the method comprising:
    estimating mean and variance parameters from the image using a Gaussian model;
    calculating a CDF using the mean and variance parameters and a Gaussian error function value; and segmenting the image into subimages, each subimage comprising Gaussian distributions, wherein the CDF is calculated with respect to each of the subimages, and the histogram equalization is performed by applying the CDFs to the subimages.

15. The method as recited in claim 14, wherein the Gaussian error function value is based on a Gaussian distribution with a zero mean and a unit variance.

16. The method as recited in claim 14, wherein the estimating mean and variance parameters further comprises modifying the estimated parameters where the modified parameters are used to calculate the CDF.

17. A method to equalize a histogram using a cumulative distribution function (CDF) of an image, the method comprising:

estimating parameters comprising mean and variance, from the image using a Gaussian model;

storing Gaussian error function values based on a Gaussian distribution with a zero mean and a unit variance;

calculating a CDF using the parameters and the Gaussian error function values; and segmenting the image into subimages, each subimage comprising Gaussian distributions, wherein the CDF is calculated with respect to each of the subimages, and the histogram equalization is performed by applying the CDFs to the subimages.

* * * * *

UNITED STATES PATENT AND TRADEMARK OFFICE
CERTIFICATE OF CORRECTION

| | |
|---|---|
| PATENT NO. | : 7,020,333 B2 |
| APPLICATION NO. | : 10/087831 |
| DATED | : March 28, 2006 |
| INVENTOR(S) | : Seung-joon Yang et al. |

It is certified that error appears in the above-identified patent and that said Letters Patent is hereby corrected as shown below:

TITLE PAGE, ITEM (75)
Inventors, Line 2, delete "Kyng-sun" and insert --Kyung-sun-- therefor.

Signed and Sealed this

Fifth Day of September, 2006

JON W. DUDAS
*Director of the United States Patent and Trademark Office*